Aug. 2, 1932.  E. G. THOMAS  1,869,398
TESTING DEVICE
Filed Feb. 25, 1924  2 Sheets-Sheet 1
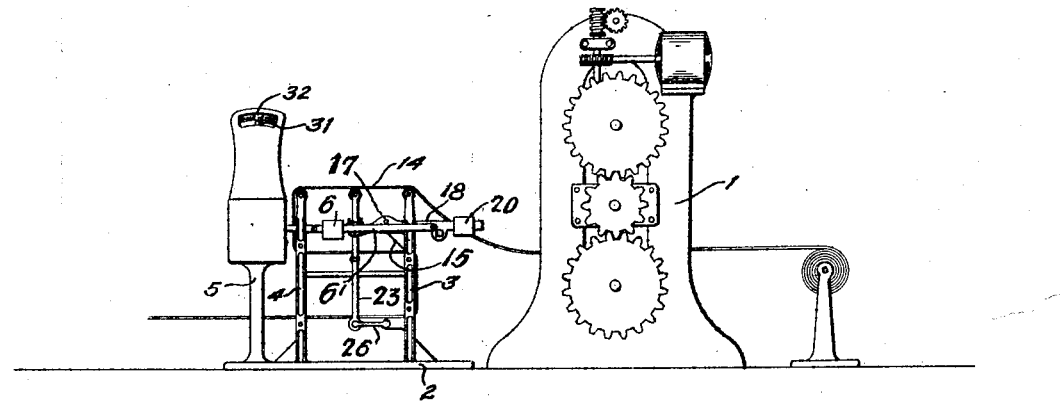
Fig. I.
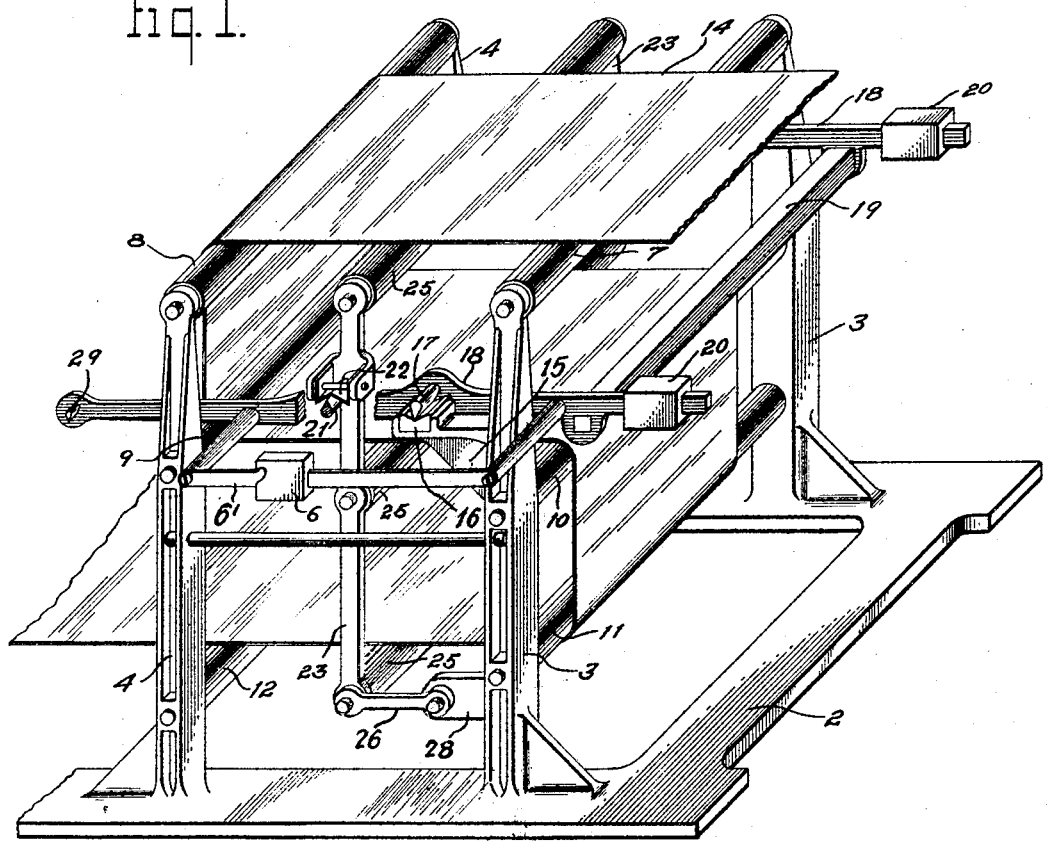
Fig. II.
Inventor
EDWARD G. THOMAS.
By CO Marshall
Attorney Aug. 2, 1932.    E. G. THOMAS    1,869,398
TESTING DEVICE
Filed Feb. 25, 1924    2 Sheets-Sheet 2
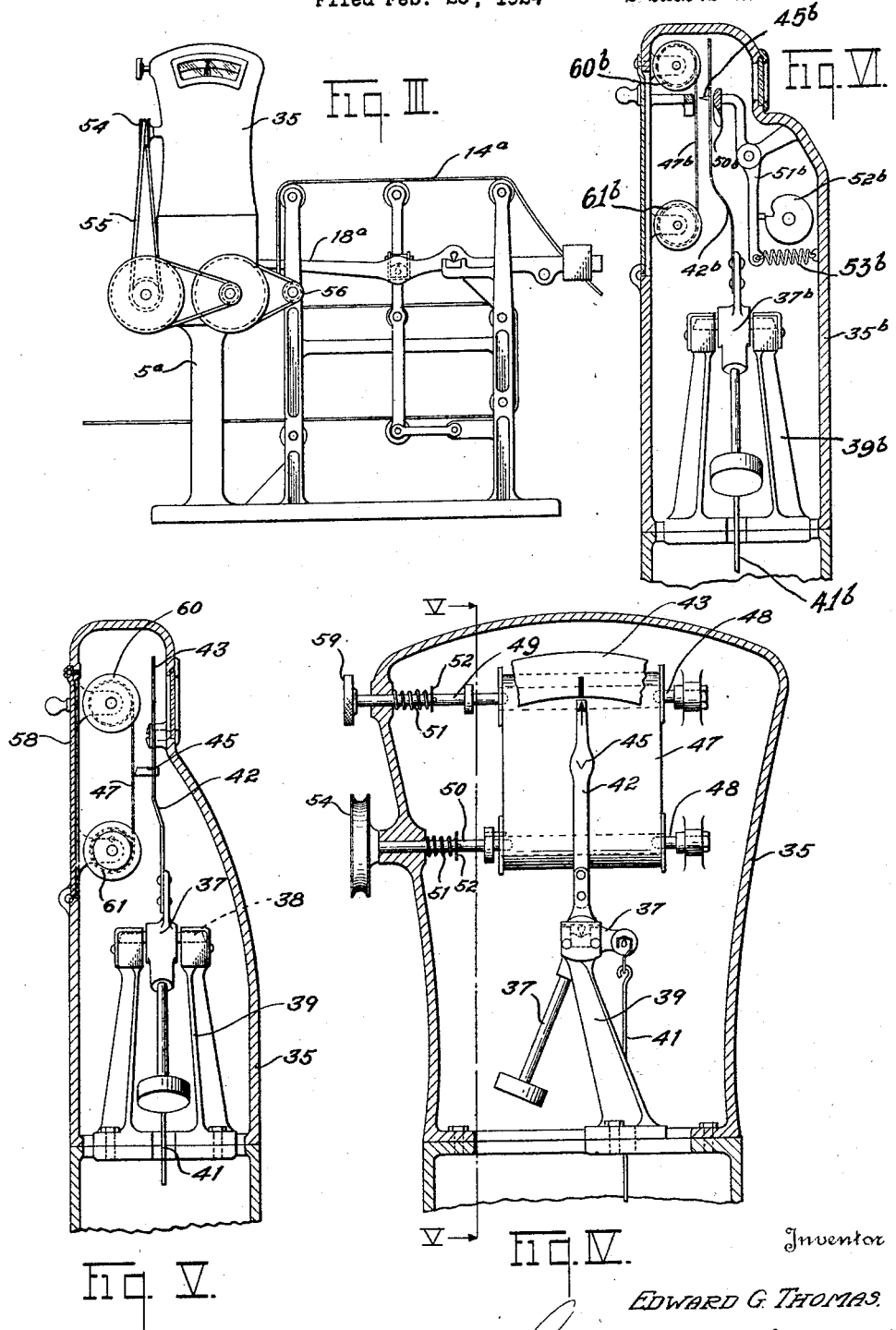

Patented Aug. 2, 1932

1,869,398

UNITED STATES PATENT OFFICE

EDWARD G. THOMAS, OF TOLEDO, OHIO, ASSIGNOR TO TOLEDO SCALE MANUFACTURING COMPANY, OF TOLEDO, OHIO, A CORPORATION OF NEW JERSEY

TESTING DEVICE

Application filed February 25, 1924. Serial No. 694,884.

This invention relates to devices for testing the weight per unit of length of strips of fabric or other flexible material. It is desirable that coated fabrics and similar products be of uniform weight and coating machines are ordinarily provided with devices whereby the weight or thickness of the coating may be increased or decreased. It is very difficult, however, to detect minute variations in the coating until a considerable length of the material has been coated and the coating is set sufficiently so that such a length of the material may be handled and weighed, and failure to immediately detect and prevent variations in the thickness or weight of the coating often results in considerable losses with a corresponding variation in the quality of the finished material. In order that minute variations in the weight of the strip per unit of length may be readily detected, it is desirable that a considerable length of the material be weighed or tested, and a device suitable for testing considerable lengths of material while the strip is extended horizontally takes up much valuable space.

One of the principal objects of my invention is to provide a device which is capable of testing considerable lengths of moving strips of material while such material is arranged to occupy comparatively small space.

Another object of the invention is to provide a strip-receiving element for a testing device, upon which element the strip of material is arranged in a plurality of loops, so that the amount of space occupied by the length of fabric being tested is comparatively small.

Still another object is the provision of a testing device embodying a strip-receiving element which is so designed that the accuracy of the testing device is not materially affected by variations in the state of tautness of the material being tested.

Still another object is to provide an automatic indicating and recording mechanism for use with the strip-receiving element, whereby a permanent record may be had of the variations in weight per unit of length of the finished material.

Other objects and advantages will be apparent from the following description, in which reference is had to the accompanying drawings illustrating preferred embodiments of my invention and wherein similar reference numerals designate similar parts throughout the several views.

In the drawings:—

Figure I is an elevational view showing a testing device embodying my invention arranged in juxtaposition to a calendering or coating machine;

Figure II is an enlarged fragmentary perspective view of the strip-receiving element, with parts broken away for purposes of illustration;

Figure III is a modification of my invention showing the strip-receiving device in combination with an indicating and recording mechanism;

Figure IV is a vertical sectional view through the housing supporting the recording and indicating mechanism;

Figure V is a vertical sectional view taken substantially on the line V—V of Figure IV; and Figure VI is a vertical sectional view showing another modification of a recording device.

Referring to the drawings in detail, the calendering machine 1 illustrated in Figure I is shown merely to better illustrate the purpose of the machine, and forms no part of the present invention. The frame of the testing device consists of a base 2, and integral with the base is a number of uprights 3—3 and 4—4 and a pedestal 5. Journaled in the upper and lower ends and intermediate the ends of the uprights 3—3 and 4—4 is a plurality of rollers 7, 8, 9, 10, 11, 12 respectively. The rollers 7 and 8 are tangent to the same horizontal plane and the rollers 9, 10, 11 and 12 are so journaled in the uprights 3—3 and 4—4 that the strip of fabric 14 in passing around the rollers in the order in which they are numbered assumes substantially an S shape, the horizontal portions of the S shape being parallel, as better illustrated in Figure II.

Positioned integrally with and extending from the uprights 3—3 are the fulcrum standards 15, and supported in bearing blocks 16 carried by the standards 15 are the fulcrum pivots 17 fixed to the levers 18, the levers being fixedly connected by means of a transversely-extending bar 19, the said levers and the bar 19 thus forming a pivoted frame. Fixed to the levers 18 are the load pivots 21 which are capable of supporting bearing blocks 22 carried by the uprights 23. Journaled at the ends and intermediate the ends of the uprights 23 is a plurality of rollers 25, the rollers being positioned beneath and the upper surfaces tangent with the planes passing through the lines where the strips of fabric contact with the rollers 7 and 8, 9 and 10, and 11 and 12 respectively.

The uprights 23 supporting the rollers 25 are held in vertical positions during movement of the levers 18 by means of check links 26, the ends of which are pivoted to the lower ends of the uprights 23 and to extensions 28 of the uprights 3.

Supported upon the pedestal 5 is an automatic predetermined weighing and indicating device that is to say, a device which indicates variations over or under a predetermined weight, the weighing and indicating mechanism (not shown) of which is operatively connected to a pivot 29 fixed to the extended end of one of the levers 18. The predetermined weighing and indicating mechanism may be of any desired type, and I have not, therefore, shown it in detail.

Slidably mounted upon the levers 18 are weights 20 of sufficient weight to counterbalance the frame formed by the levers 18, bar 19 and associated parts, as well as a portion of the length of the fabric which is supported by the frame. If a run of fabric of slightly different weight than that preceding is passed over the rollers, a readjustment of the weights 20 would be necessary. To obviate this I have provided a small poise 6 mounted on a beam 6' carried by the lever 18, which poise is sufficient to take care of slight variations in the various lots of material.

In the operation of the machine, the coated fabric from the calendering machine is passed over and around the rollers 7, 8, 9, 10, 11, 12 of the machine in the order named, forming a figure resembling an S in shape, as shown in Figure II. The weights 20 on the levers 18 are then adjusted until the indicating hand 31 is brought into registration with a predetermined point 32. When adjusted in the above manner the upper surfaces of the rollers 25 will just contact and be tangent with the horizontal portions of the strip of fabric and will necessarily support a portion of the weight thereof. If the weight of the strip be uniform, the load on the rollers 25 will be increased only when the tension on the strip is reduced sufficiently to allow the sag between the rollers journaled in the uprights 3—3 and 4—4 to lengthen those horizontal portions of the strips supported by them, and the load will be decreased only when the tension is increased sufficiently to shorten the horizontal portions of the strip between the rollers. In actual practice the tension on the fabric is very great as compared with the weight of the fabric, so that the strip is always taut, and no appreciable change in load results from small variations in tension.

Since the rollers 25 support portions of the fabric it is evident that any increase of the weight of the strip will depress the rollers 25 and any decrease in weight will allow them to move upwardly. Either movement of the rollers will cause the hand 31 to swing away from registration with the mark 32 and thus indicate a change in weight.

By passing a strip of material over the rollers as described, as the material comes from a calendering or other machine, minute variations in the weight may be at once detected and the necessary adjustments to bring the product back to its original weight may be promptly made.

In the modification shown in Figures III, IV and V, I have illustrated a recording mechanism for use with the testing machine, but it is to be understood that any suitable mechanism may be employed and that the invention is not limited to the structure shown.

The housing 35 adapted to support and enclose the recording mechanism is mounted upon a pedestal 5$^a$ similar to that shown in Figure I. The housing 35 supports a load-offsetting mechanism of any desired type, the mechanism shown comprising a pendulum structure 37 having a pivot 38 fixed thereto, the knife edges of the pivot resting in bearing blocks supported by the bracket 39. A hook and link connection 41 operatively connects the pendulum structure 37 to the extended end of the lever 18$^a$. An indicator 42 fixed to the pendulum structure 37 is adapted for registration with a central mark on a fixed chart 43 when the strip of fabric 14$^a$ is correct in weight. It will be obvious that any variations of weight of the strip of material 14$^a$ will, through the medium of the lever 18$^a$ and the connection 41, cause the pendulum to be disturbed, simultaneously moving the indicator out of registration with the mark on the chart 43, thus indicating to the operator that the coating machine is out of adjustment.

The recording device consists of a stylus 45 fixed to the indicator arm 42. The stylus may be of any suitable construction, such, for example, as the type used with steam engine indicators, pressure indicators, etc. The record sheet 47 employed is carried by a pair of spools 60 and 61, the ends of which are mounted upon fixed studs 48 and spring-pressed members 49 and 50. The springs 51 exerting expansive pressure against the collars 52 yieldingly hold the spools 60 and 61 in place.

It is desirable that a certain length of the record sheet should represent a comparatively great length of the finished material, and to accomplish this result the shaft 50 must be rotated very slowly. Any suitable speed reducing means may be employed which may be driven from a portion of the machine which travels at a rate corresponding to the rate of travel of the material 14$^a$. I have shown by way of example a pulley 54 driven by means of a belt 55 connected to a speed reducing mechanism, in turn driven by means of a belt from a pulley 56 fixed upon the shaft of one of the rollers over which the fabric passes.

It will be understood from the foregoing that a small unit of length of the sheet 47— for example, one foot—may correspond to one hundred yards of finished material. In the operation of the recording mechanism a variation in weight of the material 14$^a$ causes a corresponding variation in the position of the pendulum 37, causing the stylus 45 which is lightly in contact with the record sheet 47 to scribe a line thereon representing such variation in weight. When the available space on the sheet has become exhausted, the cover 58 on the rear of the housing 35 may be removed, and by exerting an outward force on the pulley 54 and the knob 59 against the expansive springs 51, the shafts 49 and 50 may be withdrawn from contact with the spools, the record sheet then being easily removed and a new one substituted.

I have shown in Figure VI another form of a recording device which may be employed, the load-offsetting mechanism of which is substantially the same as that illustrated in Figure V. A housing 35$^b$ adapted to enclose the mechanism also supports the load-offsetting mechanism, comprising a pendulum structure 37$^b$ mounted in bearings supported by a bracket 39$^b$. A hook and link connection 41$^b$ operatively connects the pendulum structure with the lever mechanism (not shown) similar to that shown in Figure II. An arm 42$^b$ fixed to the pendulum structure carries at its upper extremity a sharp point 45$^b$ which is in juxtaposition to the plane of a record sheet 47$^b$ carried by a pair of spools 60$^b$ and 61$^b$. A hammer 50$^b$ carried by a pivoted arm 51$^b$ is constantly urged by means of a spring 53$^b$ in a direction which would impress the point 45$^b$ into the record sheet if such hammer were not restrained by means of a cam 52$^b$. This cam is driven from some element of the testing mechanism at a rate proportional to the rate of speed of the material being tested, and the contour of the cam is such as to intermittently permit the hammer 50$^b$ to force the point 45$^b$ into the record sheet. It will be obvious that if the pendulum has been disturbed by variations in the weight of the material the position of the arm 42$^b$ will be changed, and if impressions or perforations in the record sheet 47$^b$ be made at regular intervals a record of such a variation in weight may be had, the point 45$^b$ being in contact with the record sheet only for a comparatively short space of time, as the hammer is immediately withdrawn by the cam 52$^b$ and therefore no friction is set up between the periods of making such perforations, which would impair the accuracy of the load-offsetting and recording mechanism.

By means of such recording devices an accurate record may be kept to enable the manufacturer to know whether his product conforms to a uniform standard. It also enables him to ascertain whether the operator of the calendering machine has been active in adjusting the machine to compensate for variations in the thickness and weight of the coated material.

The embodiments of my invention herein shown and described are to be regarded as illustrative only, and it is to be understood that the invention is susceptible to variation, modification and change within the spirit and scope of the subjoined claims.

Having described my invention, I claim:

1. In a device of the class described, in combination, a plurality of supports for a strip of material, means whereby the material may be formed into loops, and means engaging the material between the loops for detecting changes in the weight per unit of length.

2. In a device of the class described, in combination, a plurality of supports for a strip of material, means whereby the material may be formed into loops, and a weighing device adapted to support portions of the material between the loops.

3. In a device of the class described, in combination, a plurality of supports for a strip of material whereby said material may be formed into loops with the portions of material between the loops substantially horizontal, and a predetermined weight weighing device adapted to support portions of the material between the supports.

4. In a device of the class described, in combination, a plurality of supports for a strip of material whereby said material may be formed into loops with portions of material between the loops substantially horizontal, lever mechanism, a strip-supporting frame pivotally supported thereon, a plurality of rollers carried by said frame, the upper surfaces of said rollers being tangent with the horizontal portions of the strip between the loops, and a load-offsetting and indicating mechanism operatively connected to the aforesaid lever mechanism for detecting variations in weight per unit of length of the material.

5. In a device of the class described, in combination, a plurality of supports for a strip of material whereby said material may be formed into loops with portions of material between the loops substantially horizontal, lever mechanism, a strip-supporting frame pivotally supported thereon, a plurality of rollers carried by said frame, the upper surfaces of said rollers being tangent with the horizontal portions of the strip between the loops, and recording mechanism operatively connected to the aforesaid lever mechanism for recording variations in weight per unit of length of the material.

6. In a device of the class described, in combination, a plurality of rollers journaled in an immovable frame, a strip of material passing around the rollers forming a plurality of loops having certain portions between the rollers substantially horizontal, lever mechanism, a strip-supporting frame pivotally supported by the lever mechanism, said frame carrying a plurality of rollers adapted to contact with the horizontal portions of the strip of material, load-offsetting, indicating and recording mechanism connected to the lever mechanism to indicate and record variations in weight per unit of length of the material, the aforesaid mechanism being substantially unaffected by changes in the tautness of the strip of material.

7. In a device of the class described, in combination, a plurality of rollers journaled in an immovable frame, a strip of material passing around the rollers forming a plurality of loops, certain portions of material between the rollers being horizontal, lever mechanism, a strip-supporting frame pivotally carried by the lever mechanism, means carried by the frame for supporting a fraction of the weight of the horizontal portions of material between the rollers, manually-adjustable means for conterbalancing a portion of the load on said strip-supporting frame, automatic means for balancing the remainder of such load, and indicating means for detecting variations in weight per unit of length of material.

8. In a device of the class described, in combination, a plurality of rollers journaled in an immovable frame, a strip of material passing around the rollers forming a plurality of loops, certain portions of material between the rollers being horizontal, lever mechanism, a strip-supporting frame pivotally carried by the lever mechanism, means carried by the fame for supporting a fraction of the weight of the horizontal portions of material between the rollers, manually-adjustable means for counterbalancing a portion of the load on said strip-supporting frame, automatic means for balancing the remainder of such load, and recording mechanism for making a record of the variations in weight per unit of length of material.

9. In a device of the class described, in combination, a pair of supports for a strip of material, intermediate means adapted to be adjusted to support a portion of said strip in the same plane as the portions engaging said pair of supports, and means connected with said intermediate supporting means for recording variations in the weight of said strip per unit of length.

10. In a device of the class described, in combination, a pair of supports for a strip of material, depressible means engaging the material between said supports, means resisting the depression proportionally thereto, means controlled by said depressible means for recording variations in the weight per unit of length, said recording means including a movable recording medium, and means whereby said medium is driven at a rate proportional to the rate of travel of the strip of material.

11. In a device of the class described, in combination, a pair of supports for a strip of material, depressible means engaging the material between said supports, means resisting the depression proportionally thereto, means controlled by said depressible means for indicating the variations in weight per unit of length, said means including a load-offsetting pendulum, and means co-operating with said indicating means for recording said variations.

12. In a device of the class described, in combination, a pair of supports for a strip of material, depressible means engaging the material between said supports, means resisting the depression proportionally thereto, means controlled by said depressible means for indicating the variations in weight per unit of length, said means including a load-offsetting pendulum, and means co-operating with said indicating means for recording said variations, said recording means including a recording medium which may be replaced when exhausted.

13. In a device of the class described, in combination, a plurality of supports for a strip of material, means whereby the material may be formed into loops, and depressible means engaging portions of the material between the loops, said means resisting the depression proportionally thereto, and means controlled by said depressible means for recording variations in the weight per unit of length of the material.

14. In a device of the class described, in combination, a pair of supports for a strip of material, depressible means engaging the material between said supports, means resisting the depression proportionally thereto, means controlled by said depressible means for recording variations in the weight per unit of length, said recording means including a means for making a series of impressions on a record medium.

15. In a device of the class described, in combination, a pair of supports for a strip of material, and depressible means engaging the material between said supports, means resisting the depression proportionally thereto, means controlled by said depressible means for indicating and recording variations in the weight per unit of length, said recording means including a means for making a series of perforations in a record medium.

16. In a device of the class described, in combination, a plurality of supports for a strip of material, means whereby the material may be formed into loops, and depressible means engaging portions of the material between the loops, said means resisting the depression proportionally thereto, means controlled by said depressible means for recording variations per unit of length of material, said recording means including means for impressing a series of perforations in a record medium.

17. In a device of the class described, in combination, a pair of supports for a strip of material, and depressible means engaging the material between the supports, means resisting the depression proportionally thereto, means controlled by said depressible means for recording variations in weight per unit of length, said recording means comprising a means for making an impression in a recording medium, said latter means being intermittently actuated, the frequency of which is directly proportional to the rate of speed of the material.

EDWARD G. THOMAS.